US007631548B2

(12) United States Patent
Baba et al.

(10) Patent No.: US 7,631,548 B2
(45) Date of Patent: Dec. 15, 2009

(54) SCANNING PROBE MICROSCOPE

(75) Inventors: Shuichi Baba, Yokohama (JP); Masahiro Watanabe, Yokohama (JP); Toshihiko Nakata, Hiratsuka (JP); Toru Kurenuma, Tsuchiura (JP); Hiroshi Kuroda, Kasumigaura (JP); Takafumi Morimoto, Abiko (JP); Yukio Kembo, Tokyo (JP); Manabu Edamura, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 11/737,779

(22) Filed: Apr. 20, 2007

(65) Prior Publication Data

US 2007/0266780 A1 Nov. 22, 2007

(30) Foreign Application Priority Data

Apr. 20, 2006 (JP) ............................. 2006-116676
Mar. 13, 2007 (JP) ............................. 2007-063377

(51) Int. Cl.
*G01B 5/28* (2006.01)
(52) U.S. Cl. .............................. 73/105; 850/21; 850/35; 850/40
(58) Field of Classification Search ................. 73/105; 850/21, 35, 40
See application file for complete search history.

(56) References Cited

U.S. PATENT DOCUMENTS

| 6,257,053 | B1 * | 7/2001 | Tomita et al. ................. 73/105 |
| 6,677,697 | B2 * | 1/2004 | Struckmeier et al. ........ 310/328 |
| 6,818,891 | B1 * | 11/2004 | Hough et al. .................. 850/3 |
| 7,044,007 | B2 * | 5/2006 | Struckmeier et al. ...... 73/862.51 |
| 7,373,806 | B2 * | 5/2008 | Kitajima et al. ................ 73/105 |
| 7,446,324 | B2 * | 11/2008 | Mirkin et al. ............. 250/492.1 |

FOREIGN PATENT DOCUMENTS

| JP | 2936545 | 6/1999 |
| JP | 11-352135 | 12/1999 |
| JP | 2001-033373 | 2/2001 |
| JP | 2004-125540 | 4/2004 |
| JP | 2004-264039 | 9/2004 |

\* cited by examiner

*Primary Examiner*—Hezron Williams
*Assistant Examiner*—Rodney T Frank
(74) *Attorney, Agent, or Firm*—Antonelli, Terry, Stout & Kraus, LLP.

(57) ABSTRACT

With a scanning probe microscope, if a plurality of sample properties are measured using a scanning scheme of allowing a probe to approach and withdraw from a sample, the sample properties need to be accurately and reliably detected in the minimum required measurement time. Further, the acting force between the probe and the sample varies depending on the type of the probe and the wear condition of a probe tip. Thus, disadvantageously, property values acquired using different probes cannot be compared with one another unless the artifactual effect of the measuring probes are eliminated. In accordance with the present invention, with a scanning probe microscope, the probe is brought into intermittent contact with the sample, while driving means repeatedly allows the probe to approach and withdraw from the sample with a variable amplitude. The sample property is thus acquired at a high speed. Further, a calibration sample is used in a given environment (given temperature and humidity) to acquire a force curve for at least one point. Information obtained from the force curve is used to correct measurements to display the distribution of the sample property.

20 Claims, 16 Drawing Sheets

※VARIATION OBSERVED IF DEFLECTION SIGNAL VARIES
IN POSITIVE DIRECTION WHEN PROBE TIP ROTATES CLOCKWISE

SCANNING PROBE MICROSCOPE

The present application is based on and claims priority of Japanese patent application Nos. 2006-116676 filed on Apr. 20, 2006, and 2007-063377 filed on Mar. 13, 2007, the entire contents of which are hereby incorporated by reference.

BACKGROUND OF THE INVENTION

1. Field of the Invention

The present invention relates to a method for, in measurements using a scanning probe microscope, acquiring a plurality of sample properties to display results, and a method for evaluating a sample using the same, and to a scanning probe microscope that can acquire a plurality of sample properties to display results. Application fields of the present invention include biology, physics, semiconductors, and storages. Using the present invention for research and development in these fields enables an increase in the efficiency of the research and development.

2. Description of the Related Art

Scanning probe microscopes (SPM) are known as a technique for measuring micro three-dimensional shapes. With this technique, a sharpened probe is located in proximity to or in contact with the surface of a sample to display an image for the measured amount of physical interaction such as an atomic force between the probe and the sample.

An atomic force microscope (AFM), one of the scanning probe microscopes, is a technique of measuring the feature of the surface of a sample by detecting the atomic force acting between a measuring probe and the sample, that is, the contact force between the probe and the sample, on the basis of the amount of displacement resulting from deflection of the probe, and scanning the sample surface while controllably keeping the displacement constant. The atomic force microscope is widely used in various fields such as biology, physics, semiconductors, and storages.

The AFM measuring scheme is roughly divided into a non-contact scheme of making measurement with the probe not in contact with the sample and a contact scheme of making measurement with the probe in contact with the sample. The contact scheme is further divided into a scheme of performing scans with the probe in continuous contact with the sample and a scheme of performing scans with the probe in intermittent contact with the sample. These measurement schemes enable the AFM to simultaneously acquire not only the surface shape of the sample but also sample properties other than the surface shape, for example, a mechanical property, an electrical property, and a magnetic property. Simultaneous acquisition of a plurality of sample properties enables the analysis of various aspects of the measurement target. Accordingly, these schemes are very effective for evaluating the measurement sample.

For example, a measuring method of moving (scanning) the probe parallel to the sample surface with the probe in contact with the sample enables the detection of a force (frictional force) acting parallel to the sample surface during scanning.

On the other hand, with a scanning scheme of bringing the probe into intermittent contact with the sample while performing, at each measurement position, the operation of moving (lowering) the probe closer to or withdrawing (elevating) the probe from the sample, it is possible to detect the force (adhesive force and elastic force) acting perpendicularly to the sample surface. Measuring schemes enabling this process include the method shown in Japanese Patent Laid-Open Publication No. 11-352135 and the schemes disclosed in Japanese Patent Publication No. 2936545 and Japanese Patent Laid-Open Publication No. 2001-33373.

Japanese Patent Laid-Open Publication No. 11-352135 describes a method of vibrating a probe at a frequency equal to or lower than its resonant frequency so that the probe and a sample periodically repeat contacting and leaving each other and detecting the resulting interaction between the probe and the sample as well as the physical properties of the sample. Further, Japanese Patent Laid-Open Publication No. 2004-264039 describes a scanning probe microscope that measures the surface shape of a sample, wherein a measurement area is determined on the basis of an image of the sample surface and the measurements of the sample surface are corrected on the basis of the status of the probe.

When the method described in Japanese Patent Laid-Open Publication No. 11-352135 (the probe is allowed to repeatedly withdraw from and approach each point on the sample) is used to acquire the shape of the sample and the properties of the sample other than its shape, if the adhesive force between the probe and the sample is great with respect to the vertical amplitude of the probe, the adhesive force may disadvantageously not detected.

The magnitude of the adhesive force between the probe and the sample is unknown before measurement and varies depending on a measurement position. Consequently, if the vertical amplitude of the probe is thus set at a sufficiently great value, vibration period (measurement period per point) increases to preclude high-speed measurements.

Further, the acting force between the probe and the sample varies depending on the type of the probe and the wear condition of the probe tip. Accordingly, the material of the probe and the shape of the probe tip compositively affect the properties acquired. That is, a comparison of property values acquired using different probes requires the artifactual effect of the probe to be eliminated.

SUMMARY OF THE INVENTION

The present invention is provided in view of the above problems. The present invention provides a scanning probe microscope that, in acquiring a plurality of sample properties by allowing the probe to approach and withdraw from the sample, acquires at least one sample property while varying the amplitude of the withdrawal and approach depending on the magnitude of the adhesive force between the probe and the sample, to display a sample property distribution acquired for rapid and reliable detection of absorbability.

Further, to accomplish the object of eliminating the artifactual effect of the probe, corrections of the artifactual effect are made and a sample property distribution is similarly displayed.

The present invention allows the probe to withdraw from and approach the sample with the minimum required amplitude instead of a constant amplitude used in the conventional art. This enables a plurality of sample properties to be measured at a high speed in the minimum required time.

Furthermore, the present invention allows various aspects of the measurement target to be analyzed by acquiring a plurality of sample properties from the same measurement area and superimposedly displaying distribution images for the sample properties.

DETAILED DESCRIPTION OF THE PREFERRED EMBODIMENTS

Embodiments of the present invention are described below with reference to the drawings.

Embodiment 1

Figure 1:
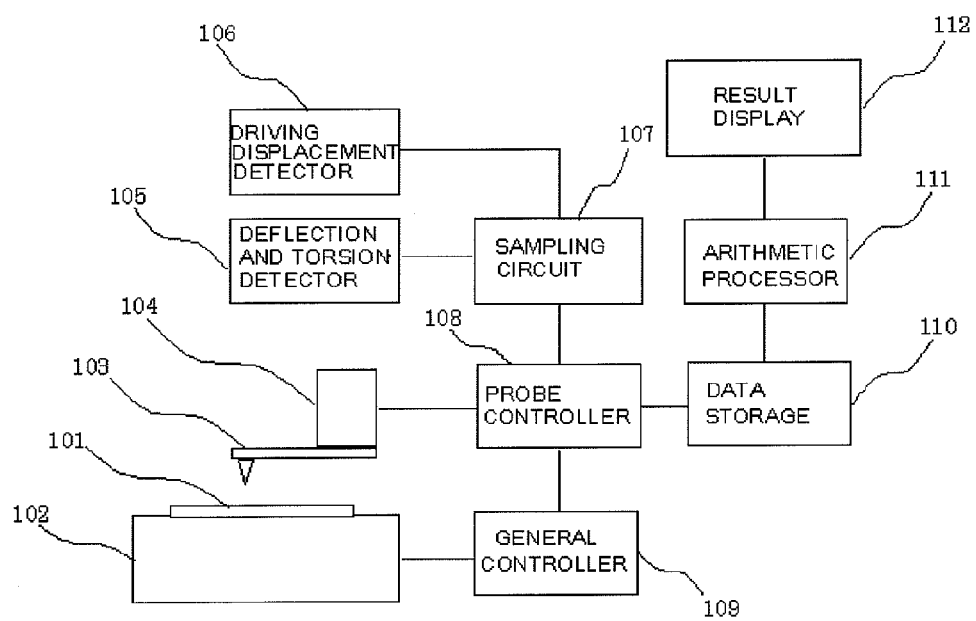
FIG. 1 is a diagram showing an example of the configuration of a scanning probe microscope in accordance with Embodiment 1 of the present invention.

FIG. 1 shows an example of the configuration of a scanning probe microscope in accordance with Embodiment 1 of the present invention.

The device is composed of a sample stage 102 that is movable with a measurement sample 101 placed thereon, a probe 103 that scans the sample, a probe driver 104 that drives the probe in an X direction, a Y direction, and a Z direction, a deflection and torsion detector 105 that detects the deflection and torsion of the probe, a driving displacement detector 106 that detects the driving displacement of an X axis, a Y axis, and a Z axis, a sampling circuit 107 that samples each sensor signal detected, a probe controller 108 that gives instructions to the probe driver 104, a general controller 109 that controls the sample stage, measuring sequences, and the like, a data storage 110 in which data is recorded, an arithmetic processor 111 that executes an arithmetic process and the like, and a result display 112 that displays the results of processing executed by the arithmetic processor. The probe driver 104 is ordinarily composed of a piezoelectric element that can control a deformation amount in accordance with an applied voltage, but may use any other actuator such as a voice coil motor. The deflection and torsion detector 105 generally uses an optical lever or the like which is composed of a laser and a quadrant photodiode. Detection with the optical lever allows the deflection and torsion amounts of the probe to be detected as a variation in a laser spot position on the quadrant photodiode.

In the illustrated example, the XYZ driver 104 is provided on the probe side. However, the present invention can be implemented without posing any problem even when the XYZ driver 104 is provided on the sample side.

For measurement, the probe 103 is placed in proximity to or in contact with the sample surface. The sample stage 102 or the probe scanner 104 controls the relative positions of the probe and the sample, with the resulting physical interaction such as an atomic force measured by a sensor. Output signals from sensors are sampled at a given timing by the sampling circuit 107. On the basis of outputs from the deflection and torsion detector 105 and the driving displacement detector 106, the probe controller 108 outputs a driving signal to the probe scanner 104 to quickly control the approach and withdrawal of the probe 103 to and from the sample 101 at variable amplitude. Sampled sensor signals are recorded in the data storage 110 in response to a trigger signal from the probe controller 108 and then processed by the arithmetic processor 111 and displayed on the result display 112 as numerical values or images.

Embodiment 2

Figure 2:
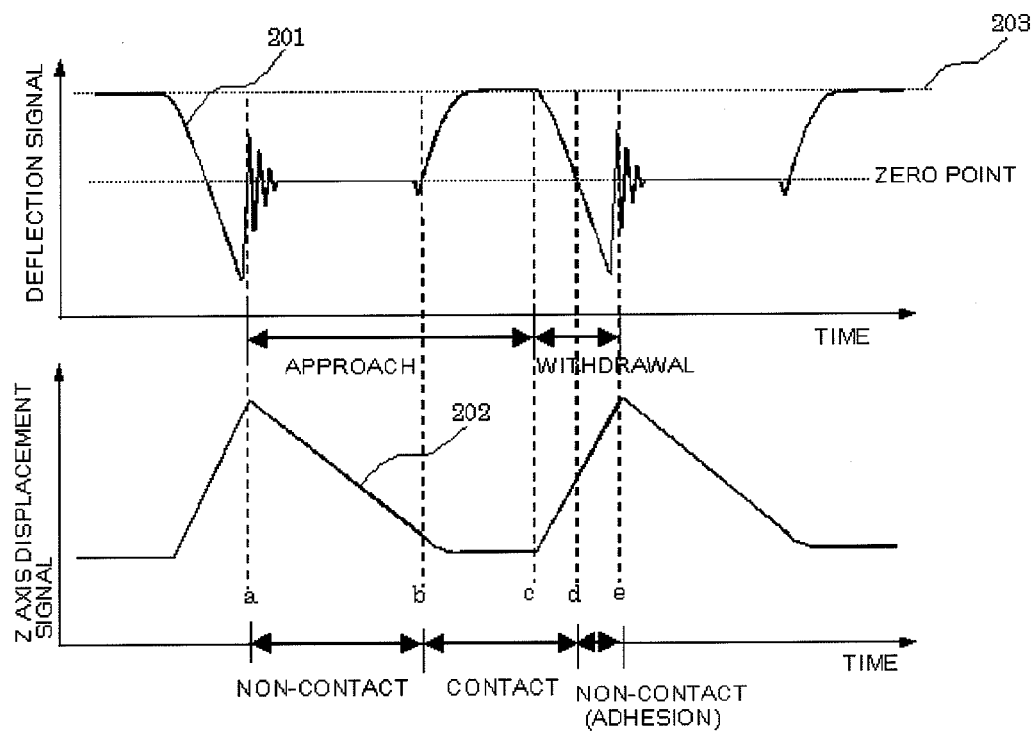
FIG. 2 is a diagram showing the operation of a probe and a variation in deflection signal observed for the determination of a sample property in accordance with Embodiment 2 of the present invention.
Figure 2:
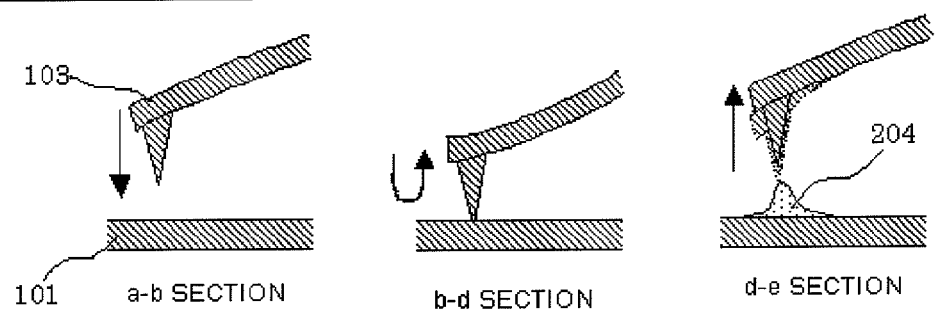

With reference to FIG. 2, description will be given of a method of calculating a sample property using a scanning scheme of allowing the probe to withdraw from and approach the sample (the scheme disclosed in Japanese Patent Laid-Open Publication No. 2001-33373).

The present scheme moves the probe perpendicularly to the sample surface with the scanning of the probe completely stopped (the speed in a scanning direction is zero). This allows a force acting perpendicularly to the sample surface to be accurately detected. FIG. 2 shows a variation in each sensor signal observed when the present scheme is used. Reference numeral 201 denotes a deflection signal indicative of a variation in the deflection angle of the probe. Reference numeral 202 denotes a Z axis variation signal indicative of a variation in the displacement of the Z axis.

In an a-b section in FIG. 2, the probe is allowed to approach the sample and is not in contact with the sample. In a b-c section in FIG. 2, the probe is being allowed to approach the sample and is in contact with the sample. In a section c-d in FIG. 2, the probe is being allowed to withdraw from the sample and is in contact with the sample. In a d-e section in FIG. 2, the probe is being withdrawn from the sample with moisture 204 or the like on the sample surface adhering to the probe.

Description will be given below of the operation of the probe and a variation in deflection signal. The deflection signal varies when the probe receives force from the sample and thus does not vary but remains fixed while the probe is sufficiently away from the sample (no force acts on the probe).

The probe located completely away from the sample is allowed to approach the sample. Immediately before the probe comes into contact with the sample, the probe is attracted to the sample surface under the attractive force of the sample and comes into contact with the sample (a-b section).

When the probe contacts the sample, the deflection signal varies in proportion to the contact force between the probe and the sample. The probe continuously lowers until the amount by which the probe is pushed into the sample reaches a given value 203 (predetermined contact force) (b-c section).

Once the amount by which the probe is pushed into the sample reaches the given value 203, the probe starts to withdraw. The force acting on the probe gradually weakens (c-d section).

When the amount by which the probe is pushed into the sample is zeroed, no force acts on the probe (point d). However, the sample surface subsequently adheres to the probe. In this moment, the probe is subjected to an attractive force. This causes the probe to be deflected in a direction opposite to that of the deflection observed in the contact condition. As a result, the deflection signal changes in a direction opposite to that observed in the contact condition (d-e section).

Further continuing the withdrawal releases the probe from the adhesive condition. The probe thus vibrates freely at the resonant frequency. At this time, the deflection signal also vibrates at the same frequency. After the withdrawal of the probe is finished, the probe starts to approach the sample again.

Figure 3:
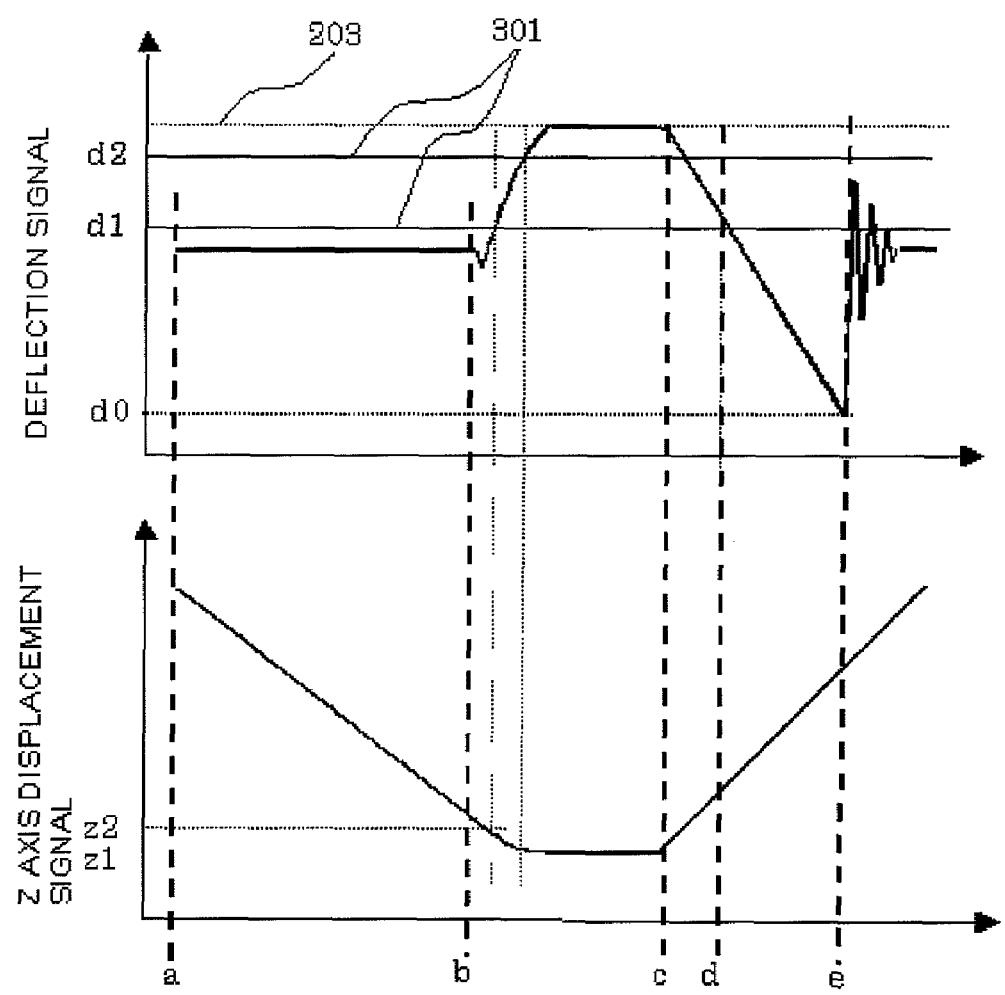
FIG. 3 is an enlarged view of sections a to e showing the operation of the probe and the variation in deflection signal in FIG. 2.

The series of operations described above are repeated for each measurement point to acquire each property value. With reference to FIG. 3, an enlarged view of the sections a to e in FIG. 2, description will be given of sample properties detected in each of the above sections and a method for calculation.

In the b-d section, the probe is in contact with the sample, enabling the measurement of the elastic property of the sample. An elastic property k2 can be determined on the basis of deflection signals (d1 and d2 in FIG. 3) and Z axis displacement signals (z1 and z2 in FIG. 3) obtained at two points of time in the b-d section, the spring constant k1 of the probe, and the ratio C of the change amount of the deflection signal to the deflection amount of the probe (=Z axis travel distance).

The amount by which the probe is pushed into the sample is defined as $\Delta x$, and the travel distance of the probe is defined as $\Delta z$. Then, k2 is expressed by:

$$k2 = k1 \cdot \Delta x / (\Delta z - \Delta x) \quad (1)$$

$\Delta x = (d2 - d1)/C$ $\Delta z = (z2 - z1)$

Further, an image of the shape of the sample surface can be obtained by recording the displacement of the Z axis observed when the amount by which the probe is pushed into the sample reaches the given value, or a driving signal for the Z axis.

In the illustrated d-e section, the sample surface adheres to the probe, enabling the adhesive force to be measured.

Since in this condition, the probe is about to be released from the adhesion, the maximum adhesive force of the sample surface can be determined by recording the minimum value (d0 in FIG. 3) for the deflection signal for this section.

However, if the adhesive force is so great that the deflection signal exceeds the detection range of a deflection detector or a sampling circuit, the correct adhesive force cannot be determined.

Figure 4:
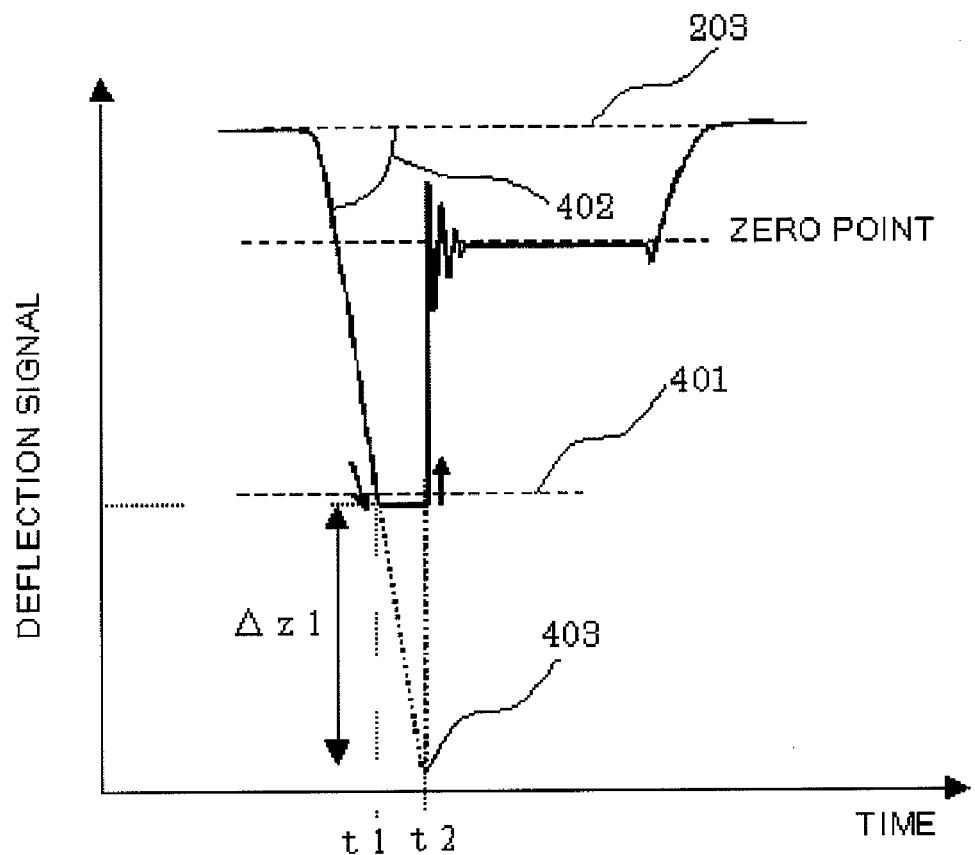
FIG. 4 is a diagram illustrating a method of detecting the maximum value of a deflection signal if adhesive force (deflection signal) exceeds the detection range of a sensor.

With reference to FIG. 4, description will be given of a method for detecting the adhesive force in this case. If the deflection signal exceeds the detection range of the sensor or the sampling circuit, the deflection signal momentarily traverses a detection limit value as shown in FIG. 4. Thus, a threshold 401 is set for the detection limit value, and timings (t1 and t2 in FIG. 4) at which the set threshold is traversed are recorded. The change rate 402 of the deflection of the probe in the adhesive condition is multiplied by the interval (t2−t1) between the recorded timings. The resulting value ($\Delta Z1$) is subtracted from the threshold 401. This allows the minimum value 403 for the deflection signal to be determined even if the deflection signal exceeds the detection range of the sensor.

An alternative method for detecting the adhesive force is to determine the adhesive force on the basis of the travel distance of the probe required to withdraw the probe (the amount by which the probe is raised from the sample).

With this method, the moment at which the probe leaves the sample surface against its adhesion during probe withdrawal is detected, the probe withdrawing distance at that moment needs to be determined. To detect the adhesion separation, the moment is detected at which the change rate of the deflection signal changes because the probe has separated from the sample surface against the adhesion.

Figure 5:
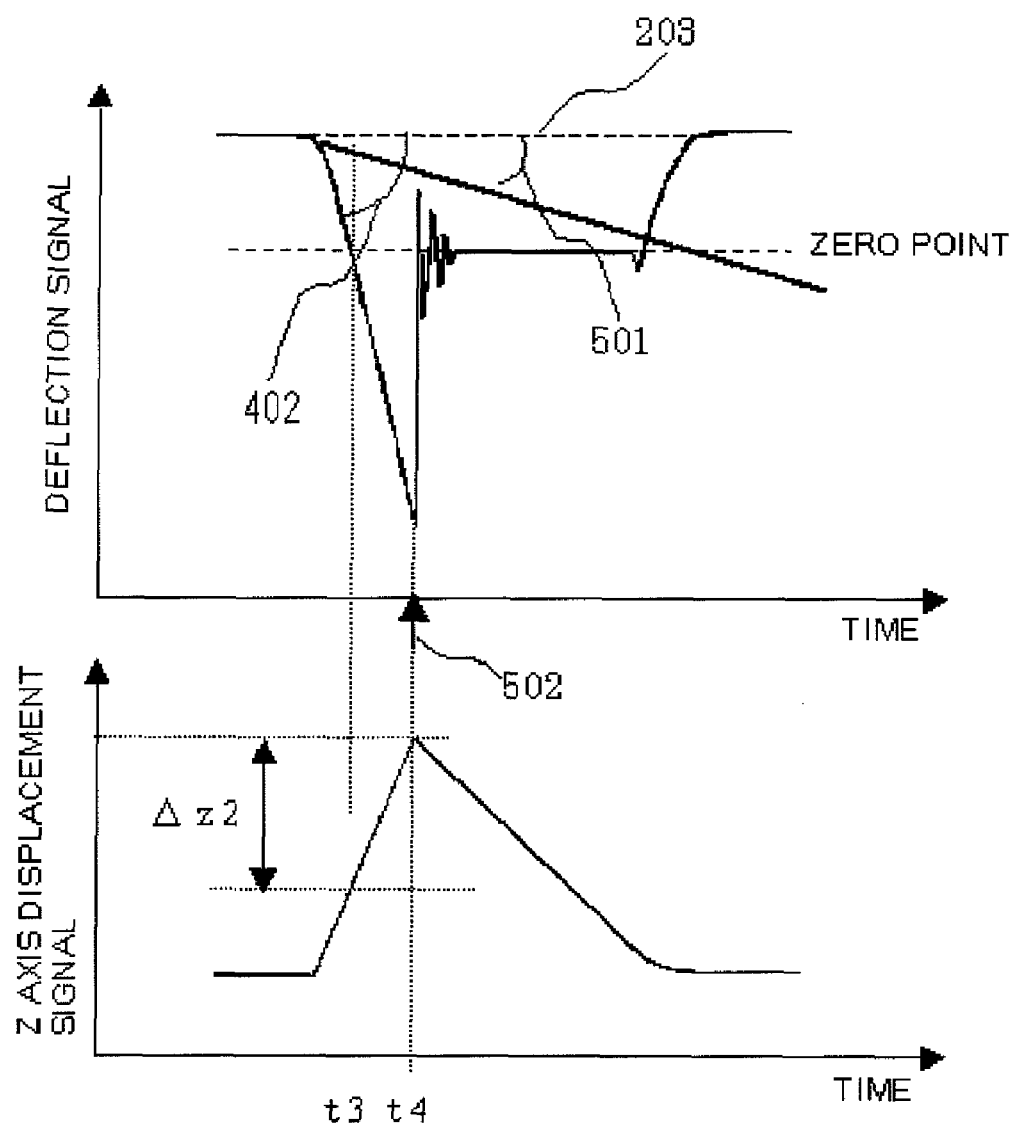
FIG. 5 is a diagram illustrating a method for sensing the moment when the change rate of the deflection signal is changed by adhesion separation.

To detect the moment at which the change rate of the deflection signal is changed by the adhesion separation, a threshold 501 is set for the change rate of the deflection signal as shown in FIG. 5 so that the moment 502 at which the change rate of the deflection signal becomes smaller than the threshold 501 can be determined to be an adhesion separation point.

The change rate threshold for the deflection signal is defined as Th. The threshold Th can be calculated from the withdraw speed V of the probe, the relationship C between the deflection angle of the probe and the change amount of the deflection signal both predetermined by measurement, and a coefficient $\alpha$ using Equation (2). The coefficient $\alpha$ determines the value of the threshold.

As shown in FIG. 5, the change rate of the deflection signal is sure to have a negative value at the moment of the adhesion separation. Thus, setting the coefficient $\alpha$ at a value between 0 and 1 reliably allows the adhesion separation point to be detected.

Further, little adhesive force may be exerted under particular measurement conditions (low humidity and insignificant probe wear). However, setting the coefficient $\alpha$ at a positive value allows the moment of adhesion separation to be sensed even with little adhesive force (the change rate of inclination observed at the moment when the probe separates from the sample surface is almost zero).

$$Th = V \times C \times \alpha \quad (2)$$

The withdrawal distance (the travel distance $\Delta Z2$ of the Z axis) of the probe required for adhesion separation can be calculated from the Z axis position detected at the moment when the deflection signal becomes zero (the moment when the amount by which the probe is pushed into the sample becomes zero: t3 in FIG. 5) after the start of probe withdrawal and the Z axis position detected at the time of adhesion separation (t4 in FIG. 5). Then, the adhesive force F can be calculated, using Equation (3), from the determined travel distance of the Z axis ($\Delta Z2$) and the relationship C between the deflection angle of the probe and the change amount of the deflection signal both predetermined by measurement.

$$F = \Delta Z \times C \quad (3)$$

Figure 6:
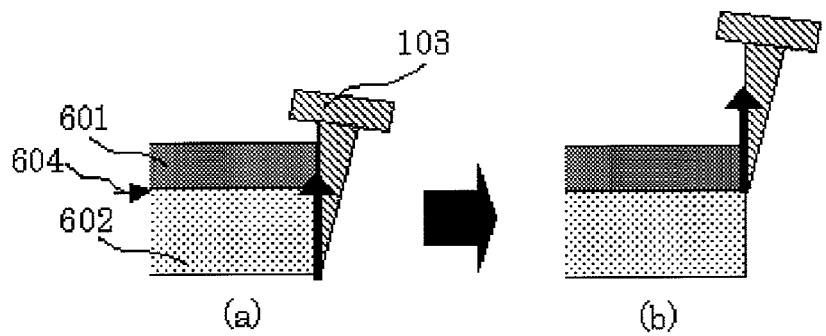
FIG. 6 is a diagram illustrating a variation in the deflection signal change rate observed while the probe is moving along a pattern side wall.
Figure 6:
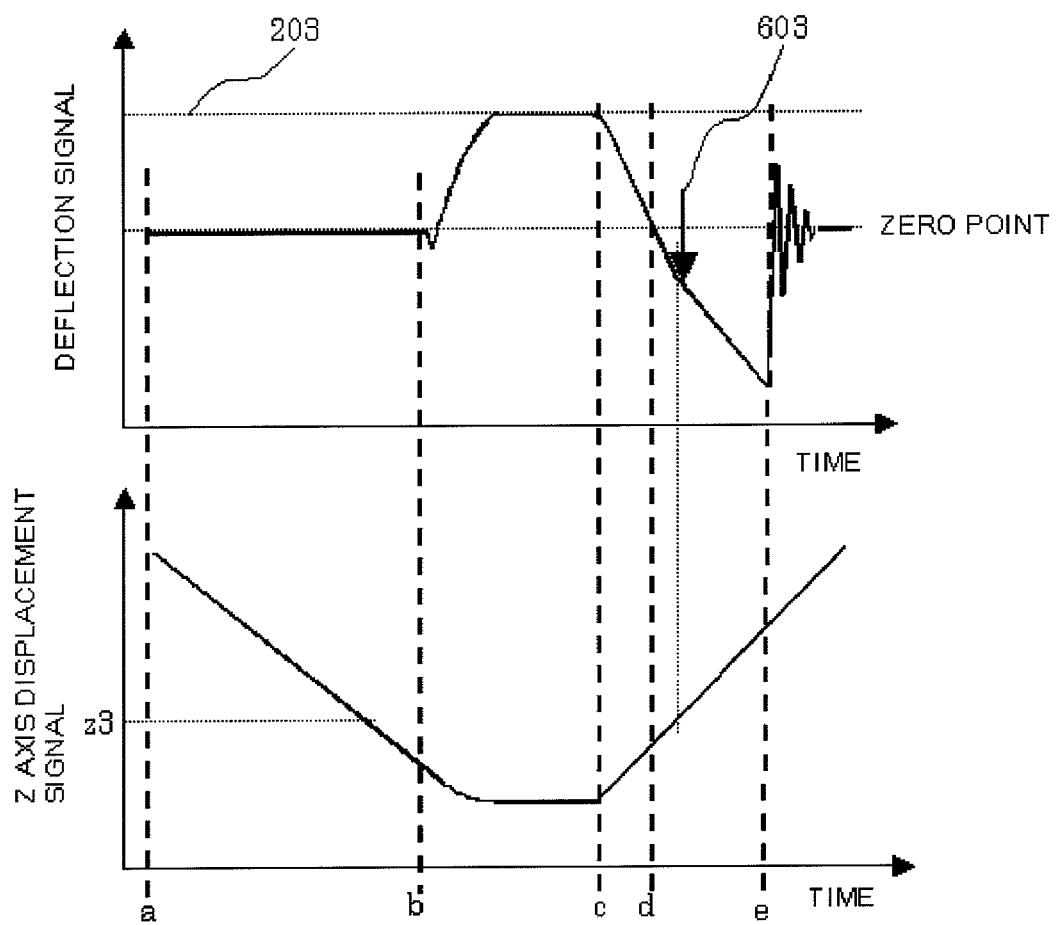

Now, with reference to FIG. 6, description will be given of a method for detecting a material boundary in a pattern sidewall. When the sample has a steep pattern sidewall, the sample sidewall adheres to the probe being withdrawn. The probe thus slidably rises along the sidewall as shown in FIG. 6.

In this case, if the pattern sidewall is not composed of a uniform material but of at least two materials, the force under which the probe adheres to the sidewall changes between before the probe passes through the boundary between the materials (FIG. 6A) and after the probe has passed through the boundary (FIG. 6B) due to the difference of material. This changes the change rate of the deflection signal.

Thus, by detecting a change point 603 of the change rate of the deflection signal and measuring the Z axis position (Z3) detected at this moment, it is possible to determine a boundary position 604 between the materials.

The thickness and position height of the material in the upper part of the pattern can also be determined from the surface of the pattern and the determined height Z3 of the boundary position.

Figure 7:
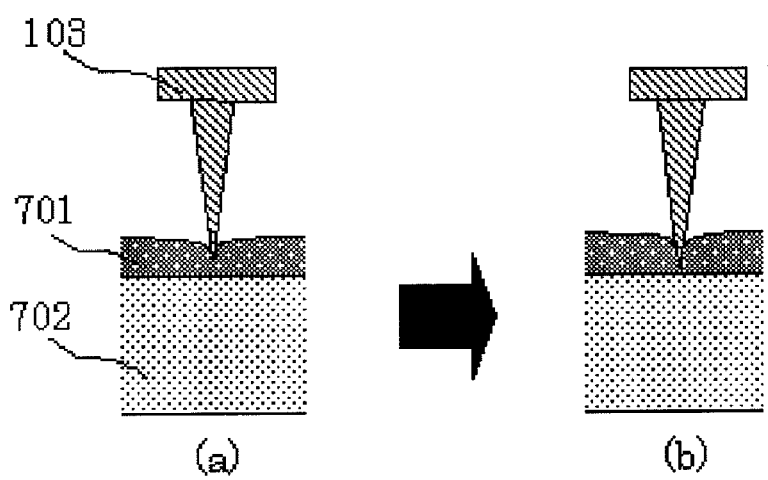
FIG. 7 is a diagram illustrating a variation in the deflection signal change rate observed while the probe is moving through an adhesive layer.
Figure 7:
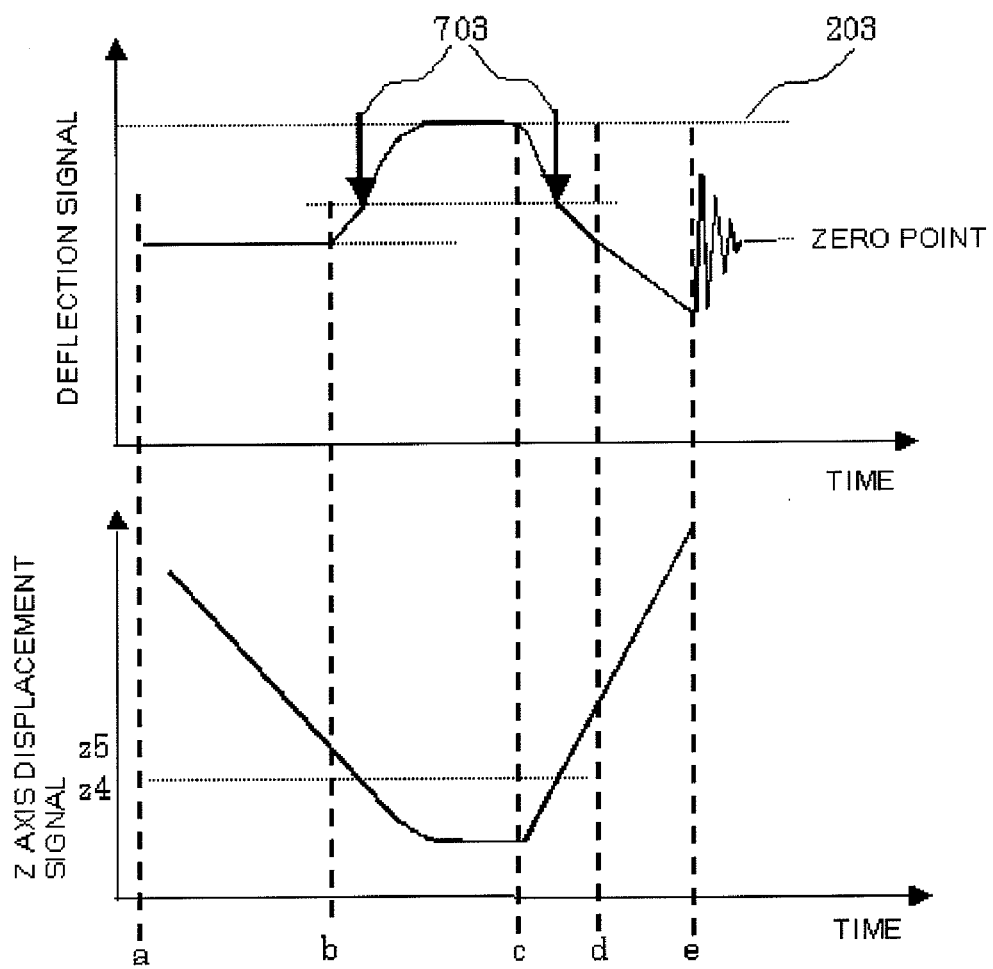

Now, with reference to FIG. 7, description will be given of a method for, when an adhesive layer is present on the sample surface, detecting the thickness of the adhesive layer. As shown in FIG. 7, if an adhesive layer 701 is present on the surface of the sample 702, the change rate of the deflection signal obtained when the probe approaches or withdraws from the sample varies between when the probe tip is located inside the adhesive layer (FIG. 7A) and when the probe tip reaches the bottom (sample surface) of the adhesive layer (FIG. 7B). When the probe tip is inside the adhesive layer (FIG. 7A), the probe tip moves through the adhesive layer while pushing its way out through the adhesive layer. This makes the change rate of the deflection signal lower than that obtained when the probe tip reaches the sample surface (FIG. 7B). Thus, the thickness of the adhesive layer (=Z5−Z4) can be detected by measuring the Z axis position (Z5) detected at the moment when the probe tip comes into contact with the surface of the adhesive layer and the Z axis position (Z4) detected at a change point 703 of the change rate of the deflection signal.

The directions of variations in the deflection signal and displacement signal, shown in the embodiments, vary depending on the device configuration or the polarity of the sensor used. However, also in this case, the above scheme enables the sample properties to be determined. This also applies to the embodiments described below.

Figure 8:
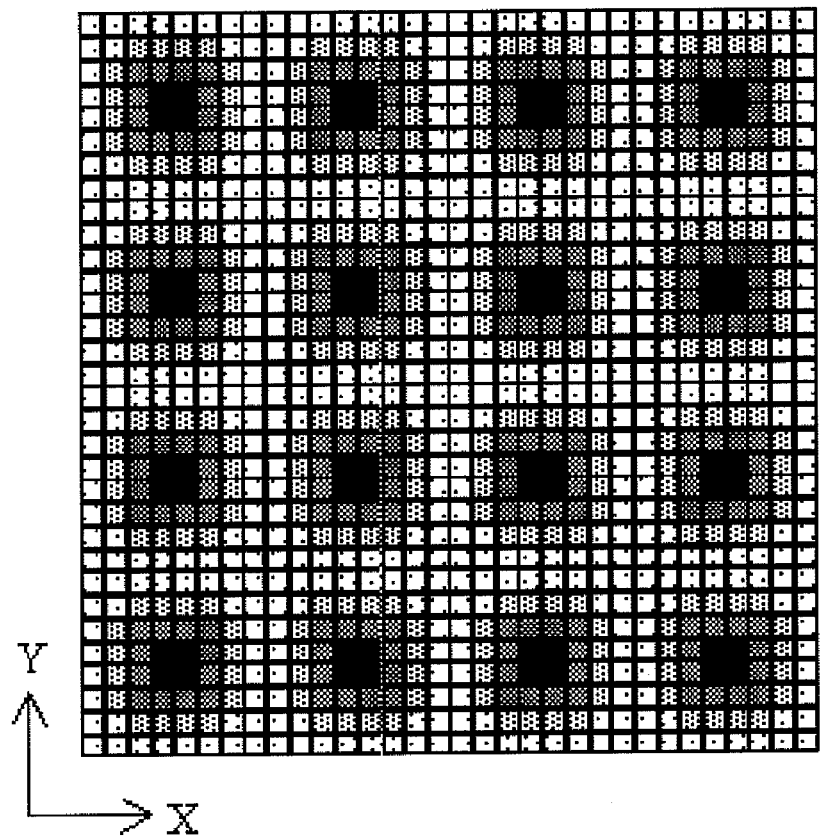
FIG. 8 is a diagram illustrating an image of the distribution of a sample property.

For each sample property determined by the above method, its distribution in the measurement area is displayed as an image as shown in FIG. 8. FIG. 8 shows the value of the sample property detected at each measurement point on an XY plane, as a gray image.

Embodiment 3

The operation of the probe and the timing of signal sampling will be described with reference to FIG. 9. After the probe starts to approach the sample, two thresholds 301 are set for the deflection signal. When the probe comes into contact with the sample to cause the deflection signal to exceed the given threshold (901), the deflection signal and the probe displacement signal are sampled to allow elastic force to be calculated.

When the amount by which the probe is pushed into the sample reaches a preset value (the contact force between the probe and the sample reaches a given value) (902), a probe displacement signal or a Z axis driving signal is sampled in order to calculate a shape image.

To approach the sample, the probe is moved at a constant speed until it comes into contact with the sample. After the probe comes into contact with the sample, servo control is performed using contact force.

The probe may be allowed to approach the sample only by servo control under the contact force. However, if the contact force servo control is only used to allow the probe to approach the sample, the speed at which the probe approaches the sample disadvantageously varies depending on a desired contact force (203). This is because the contact force servo control uses a signal proportional to the time quadrate value of an error signal (=desired contact force−current contact force), as a driving signal. While the probe is approaching the sample and before the probe comes into contact with the sample, the current contact force is zero. Accordingly, the current error signal 906 is equal to the desired contact force. Thus, a reduced desired contact force reduces the error signal and thus the level of the driving signal. This in turn reduces the approach speed. That is, a reduced desired contact force prevents high-speed measurement.

In contrast, the method for approaching in accordance with the present embodiment avoids the possible problem with servo-based approach to enable high-speed approach without relying on the desired contact force of the servo. In this case, a switching timing for the constant-speed approach and the servo control-based approach is determined on the basis of the value of the deflection signal. As shown in FIG. 9, a given threshold (904) is set for the deflection signal (contact force) so that the constant-speed approach is performed while the contact force is equal to or smaller than the threshold (904) and the contact force servo control is started at the moment when the value becomes equal to or greater than the threshold (904).

Once the contact force between the probe and the sample reaches the given value (desired value) and is stabilized by the contact force servo, the sampling is performed. When the sampling is finished, withdrawal of the probe from the sample is started.

During probe withdrawal, the probe is raised from the sample at a constant speed. After withdrawal is started, the minimum value of the deflection signal is detected in order to calculate the adhesive force. The probe is continuously withdrawn until the moment when adhesion separation is detected on the basis of the deflection signal (905).

A method for detecting adhesion separation may be similar to the method for detecting adhesion separation shown in Embodiment 2. This scheme enables the probe to be driven with the minimum required withdrawal distance at which the adhesive force can be detected. This allows measurement to be achieved in the minimum required time.

To allow the minimum value of the deflection signal to be detected, the minimum value of the deflection signal may be sequentially updated in all the sections for probe withdrawal (the d-e section in FIG. 2) as shown in Embodiment 2 or a change in deflection signal at the moment when the adhesion condition is cleared may be focused on to sample the deflection signal obtained at the moment of adhesion clearance.

Moreover, if the adhesive force exceeds the detection range of the sensor, the threshold 401 is set for the deflection signal, and the timing when the deflection signal traverses the threshold (903) is recorded so as to allow the method for detection described in Embodiment 2 to be performed.

Figure 9:
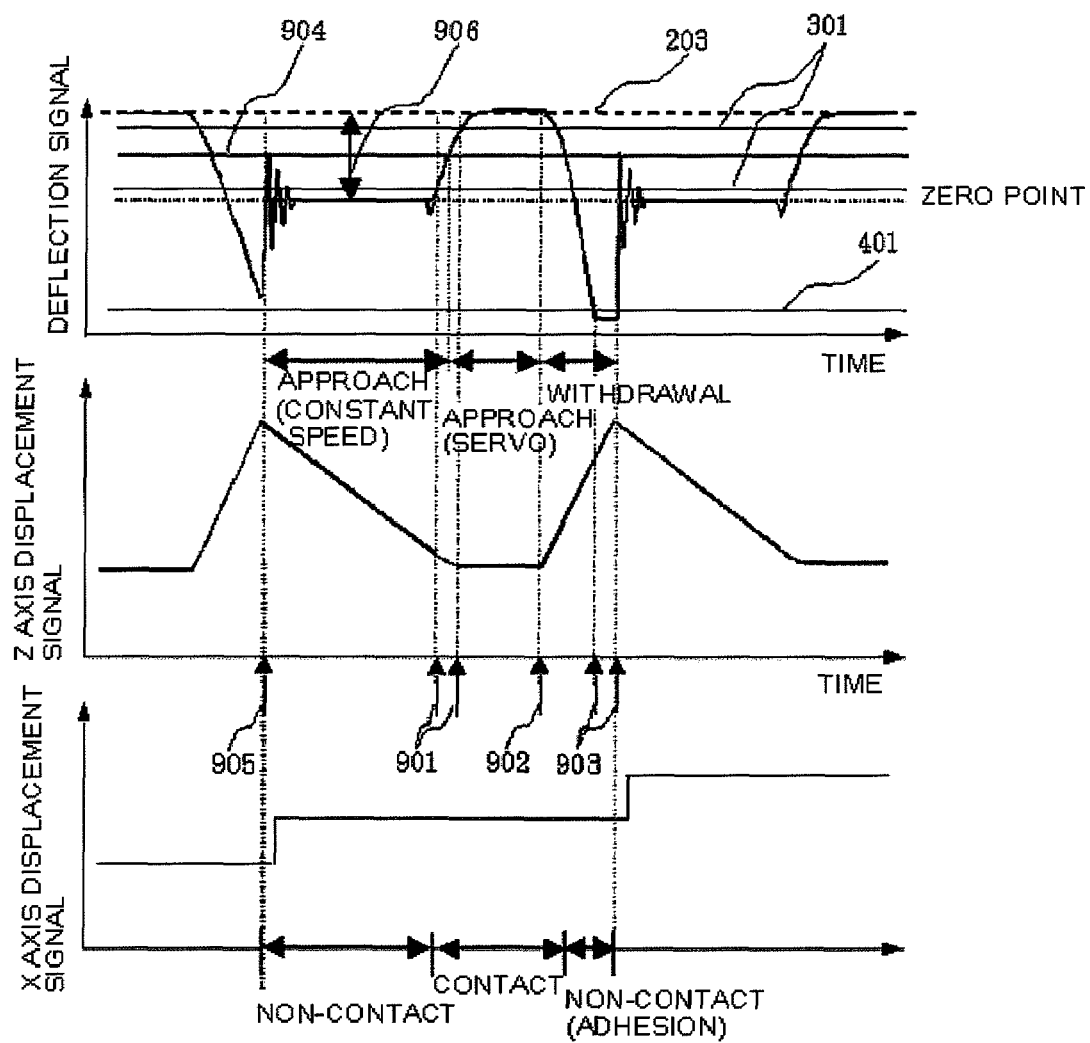
FIG. 9 is a diagram illustrating the operation of the probe and sampling timings for the deflection signal in accordance with Embodiment 3 of the present invention.

Further, as shown in FIG. 9, the probe is moved to the next measurement point while remaining out of contact with the sample. This keeps the speed of the probe in the scanning direction at zero while the probe is moving perpendicularly to the sample surface. This allows the force acting perpendicularly to the sample surface to be accurately detected, enabling an increase in measurement accuracy.

The present embodiment sets the timing of sampling of the deflection signal and probe displacement signal for calculation of the elastic force, at the point of time when the probe approaches the sample. However, sampling may be appropriately performed even while the probe is withdrawing from the sample provided that the probe is in contact with the sample. Then, on the basis of the two sets of sampled signals, the deflection signal and the probe displacement signal, the elastic force of the sample may be determined in the manner as described above.

Embodiment 4

Description will be given of a method for correcting the artifactual effect of the probe on the basis of the obtained measurements of the sample properties.

The adhesive force is most significantly affected by the probe and varies greatly depending on the type and wear condition of the probe. For example, the adhesive force is weak if the probe is insignificantly worn, and is strong if the probe is significantly worn.

To eliminate the possible artifactual effect of the probe, force curve data (relationship between the probe displacement and the deflection observed when the probe is allowed to approach and withdraw from the sample) on at least one point is acquired using a calibration sample made of a predetermined material, in an environment in which factors (temperature and humidity) determining the adhesion condition are controlled to given values.

Figure 10:
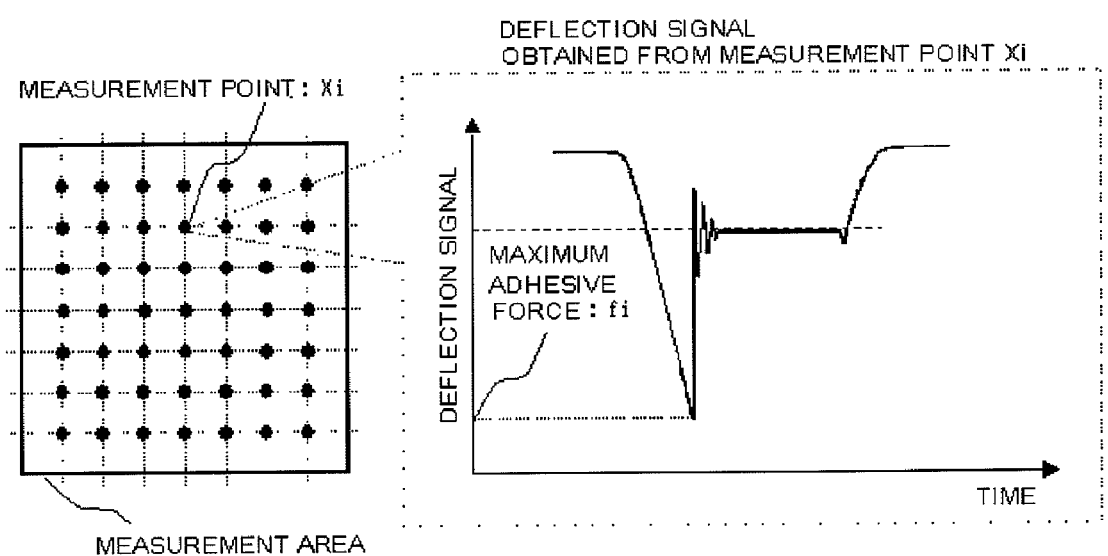
FIG. 10 is a diagram illustrating a change in deflection signal fi at a measurement point Xi in accordance with Embodiment 4 of the present invention.

Since the adhesive force also varies depending on the place where the adhesive force is exerted, measurements at a plurality of points are desirably performed over the maximum measurable range. As shown in FIG. 10, the density of the measurement points is uniformly set within this range. In this case, the average Fave of the values of adhesive force (maximum value of the deflection) fi measured by force curve operations at the respective points is set to be a calibrating reference for the adhesive force.

The adhesive force is determined in a given environment using samples of the same materials. Accordingly, if different probes are used for measurement, the results contain only the artifactual effect of the difference among the probes. The value of the adhesive force with the artifactual effect of the probe excluded can thus be obtained by dividing the adhesive force at each measurement point determined by actual measurement of the measurement sample, by the calculated reference Fave (normalization).

For the sample property with the possible artifactual effect of the probe eliminated, an image of its distribution in the measurement area is displayed as shown in FIG. 8.

Embodiment 5

Description will be given of an example in which the sample property distribution in accordance with the present invention is applied to metal CMP polishing evaluation for damascene wiring in semiconductor manufacture.

Figure 11:
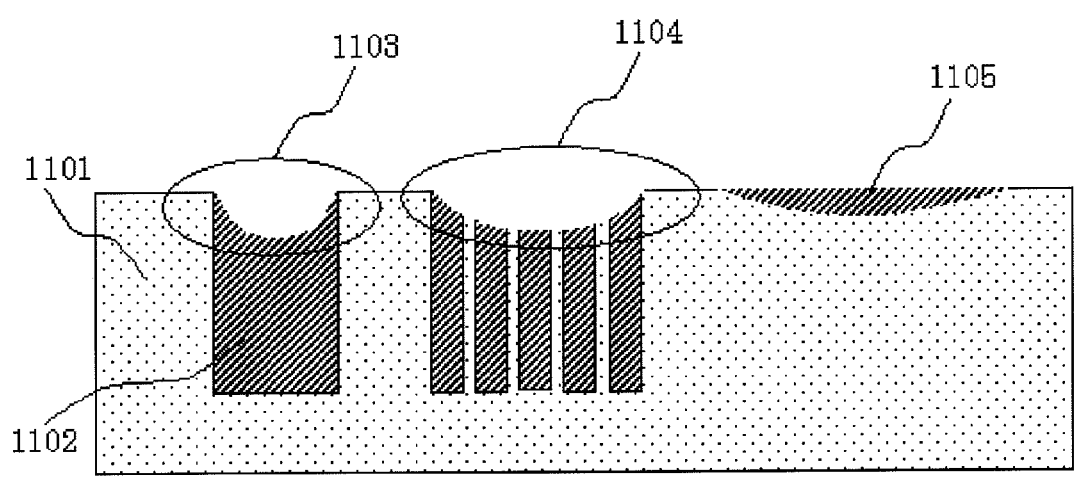
FIG. 11 is a diagram illustrating a cross section of polishing surface after the metal CMP in a semiconductor manufacturing process in accordance with Embodiment 5 of the present invention.

CMP (Chemical Mechanical Polishing) is a technique for polishing and planarizing the surface of a wafer and was initially used mainly for a process of chipping away an interlayer insulation film. The application of CMP has been expanded to an STI (Shallow Trench Isolation) process and a metal CMP process for polishing metal such as tungsten plugs, aluminum wires, and copper wires. A phenomenon associated with CMP will be described with reference to FIG. 11.

CMP is known to suffer a decrease in flatness depending on the type of a polishing agent or a polishing device used, the film properties, or the like. The decrease in flatness includes a phenomenon 1103 called dishing in which mainly the wiring cross section of a wide wiring pattern is recessed like a dish and a phenomenon 1104 called erosion in which mainly the insulating film in micro wiring is chipped away together with metal. If the metal is insufficiently polished, metal polishing residues 1105 may result.

The decrease in flatness increases the resistance value of metal wiring, degrading the reliability of the device. It is thus important to reduce the degree of dishing or erosion to improve flat performance. Further, metal-polishing residues may short-circuit the wiring. Thus, for the metal CMP process, the presence or absence of polishing residues is an important inspection item.

If a micro pattern area of the order of several tens of nanometers is measured on an actual pattern as in the present embodiment, the probe and the measurement position need to be aligned with each other (in the XY plane) with an accuracy of the order of nanometers. In this case, AFM alignment is performed using AFM measurement images of a high resolution.

The procedure of AFM alignment will be described with reference to FIG. 12. Reference numeral 1207 in FIG. 12 denotes a semiconductor wafer. A plurality of LSI chips 1208 is arranged on the semiconductor 1207. Reference numeral 1201 denotes a partial area in the LSI chip. Reference numeral 1202 inside this area is a measurement point to be evaluated (measured).

The AFM alignment involves using the AFM to measure an area containing a pattern shape selected for alignment, calculating the distance between the probe and the measurement point on the basis of measurement images obtained, and allowing a probe scanner 104 capable of precise positioning to move the probe to the measurement point.

Figure 12:
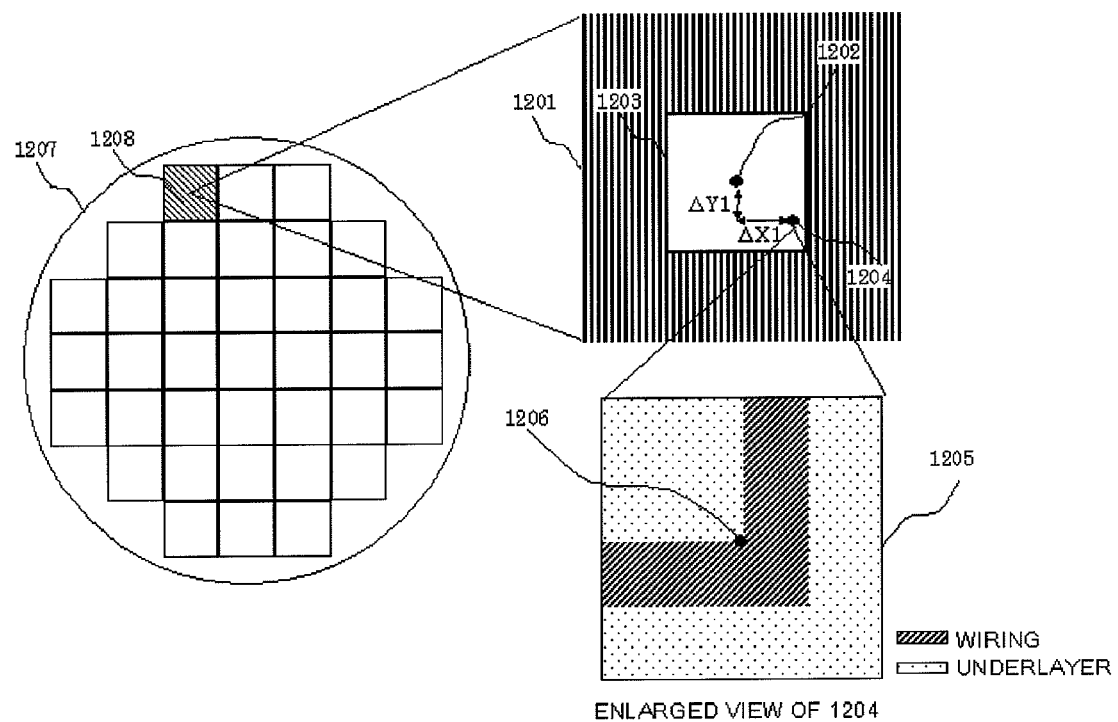
FIG. 12 is a diagram illustrating the positional relationship between a measurement area for alignment and an alignment area as well as an alignment pattern.

An alignment pattern is selected to be an area 1204 which is present within the probe scanner maximum movable range 1203 of several tens of um to several hundred um around the point 1202 to be measured and the X-Y position of which can be determined (the pattern is not uniform in the X-Y direction) 1205, as shown in FIG. 12.

In this case, the relative distance ($\Delta X1$, $\Delta Y1$) between any position (for example, 1206) on the alignment pattern and the measurement point 1202 needs to have been known from design data or the like. The alignment pattern may be selected by the user by acquiring an AFM image of the vicinity of the measurement point and appropriately selecting an area satisfying the conditions on the basis of the image acquired or may be retrieved using design information on the wiring.

After the selection of the alignment pattern, the sample stage 102, which is movable over a wide range, that is, all over the measurement sample, is used to move the probe to the position of the alignment pattern 1204 for alignment measurement. At this time, the alignment pattern is reliably caught in the measurement area of the AFM. Accordingly, the positioning accuracy of the sample stage needs to correspond to a range at least smaller than that movable range of the probe scanner.

The range of the measurement area for alignment measurement is determined by the trade-off between the positioning accuracy of the sample stage and required alignment accuracy. For precise alignment, the measurement range needs to be as small as possible but larger than the one corresponding to the positioning accuracy of the sample stage. For alignment measurement, both the surface shape and sample property are acquired from the same measurement point.

For the measurement image acquired, calculation is made of the relative distances (ΔX2, ΔY2) between the current probe position 1302 and any position 1206 on the alignment pattern on the basis of the position of the alignment pattern in the measurement range. The present embodiment uses an adhesion image 1303 as a measurement image used to calculate the relative distance between the probe and the alignment pattern.

The adhesion image is used because the polished sample is flat all over its surface. Accordingly, an ordinary surface shape 1301 does not allow the wiring pattern to be detected. The wiring pattern is ordinarily surrounded by an interlayer insulating film. Thus, the adhesion image allows the difference in material between the wiring material and the insulating film material to be detected. This allows the area of the metal wiring pattern such as 1303 to be determined even with a flat polished sample.

Figure 13:
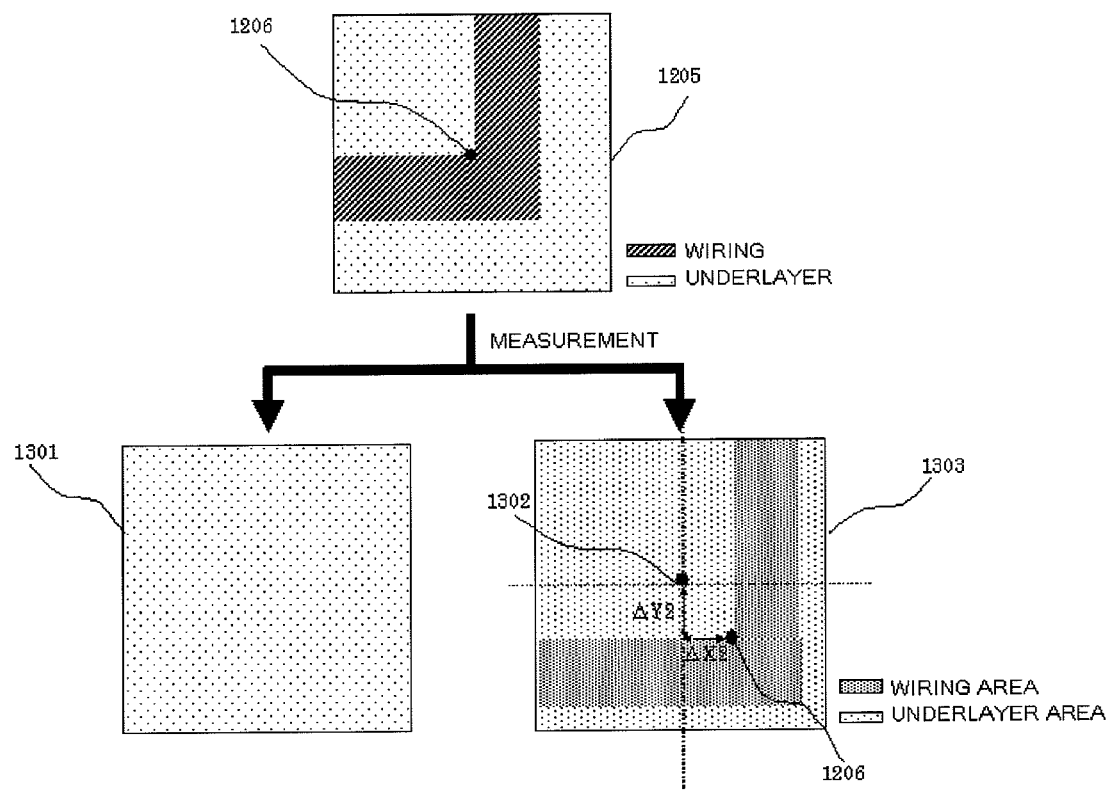
FIG. 13 is a diagram illustrating a surface shape image of the alignment pattern and an adhesion image.

As shown in FIG. 13, the relative distances (ΔX2, ΔY2) between the probe position 1302 and the position 1206 on the alignment pattern in the X and Y directions can be calculated on the basis of the position of the alignment pattern in the measurement image. The relative distance (ΔX3=ΔX1+ΔX2, ΔY3=ΔY1+ΔY2) between the probe position 1302 and the measurement point 1202 can thus be calculated by vector-adding (ΔX1, ΔY1) and (ΔX2, ΔY2) together.

Then, the probe scanner 104 moves the probe by the relative distances (ΔX3, ΔY3) calculated via the alignment to measure the evaluation point 1202.

Figure 14:
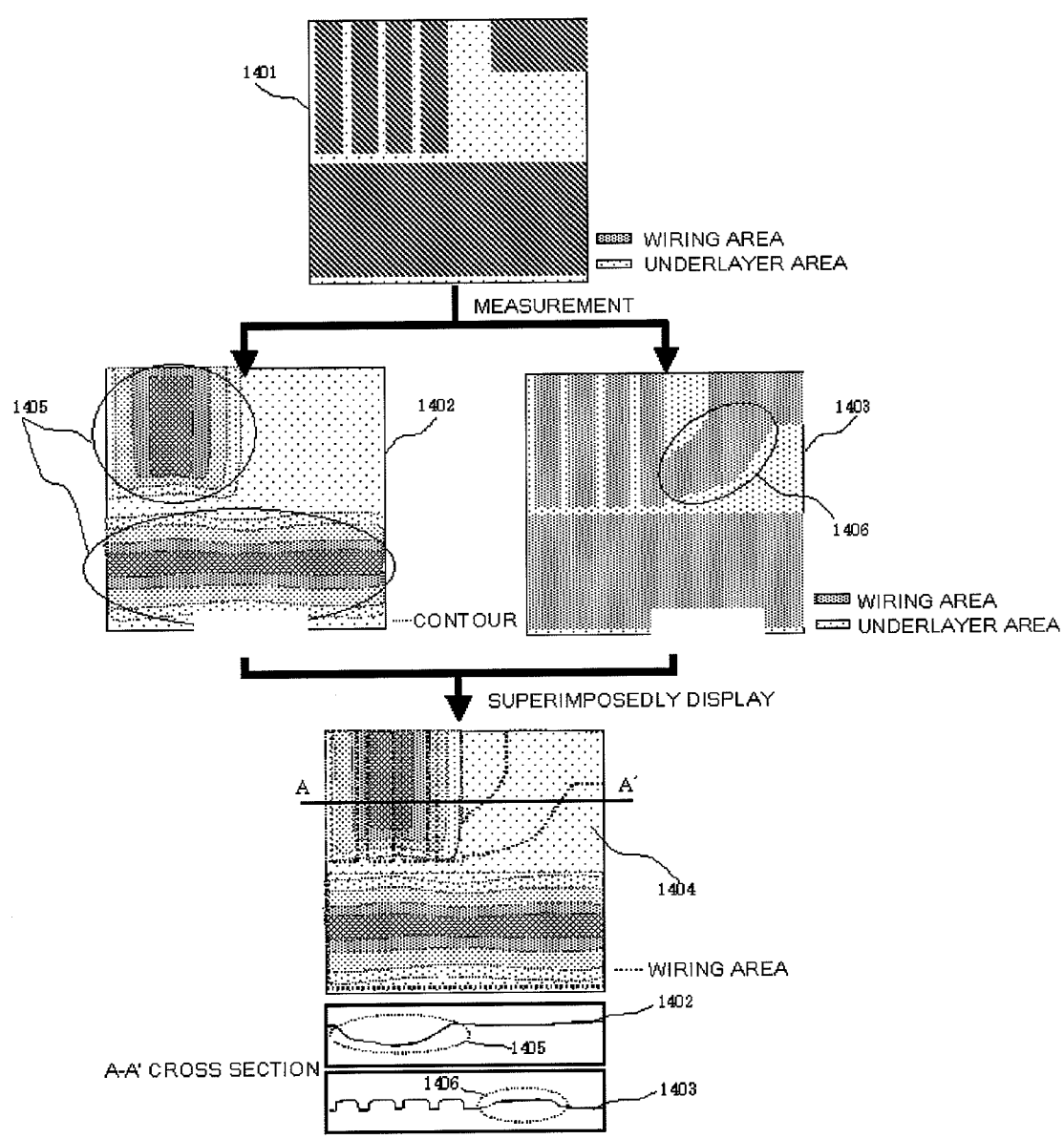
FIG. 14 is a diagram illustrating measurement images acquired with the scanning probe microscope in accordance with the present invention.

A method for evaluating the polishing characterization will be described with reference to FIG. 14. To measure a polishing characterization evaluation pattern 1401, both a surface shape image 1402 and an adhesion image 1403 are acquired for the same measurement area. The surface shape image 1402 shows the surface shape in a gray image. Recesses on the surface measured on the basis of the surface shape image are expressed as values relative to those of other surfaces. It is thus difficult to accurately evaluate the polishing characterization such as erosion or dishing unless the correspondence between the recess and the wiring pattern is clarified.

As described above, after flat process, the wiring pattern cannot be identified using the surface shape image. However, the adhesion image 1403 allows the wiring pattern to be identified. Thus, as shown at 1404, a surface shape image (surface recess information) and a sample property image (wiring area information) obtained from the same measuring point are superimposedly displayed to associate the wiring area with the recesses and projections on the surface. This clarifies an erosion or dishing part.

Further, the sample property image enables the wiring material portion to be identified, allowing an over-polishing area and an under-polishing area to be identified. For example, as shown in FIG. 14, an area 1405 having a surface position lower than the surrounding areas on the wiring pattern can be determined to be an over-polishing area (containing erosion or dishing). If a wiring material portion 1406 is detected in an area other than the wiring pattern, that area can be determined to have been insufficiently polished (polishing residue).

Figure 15:
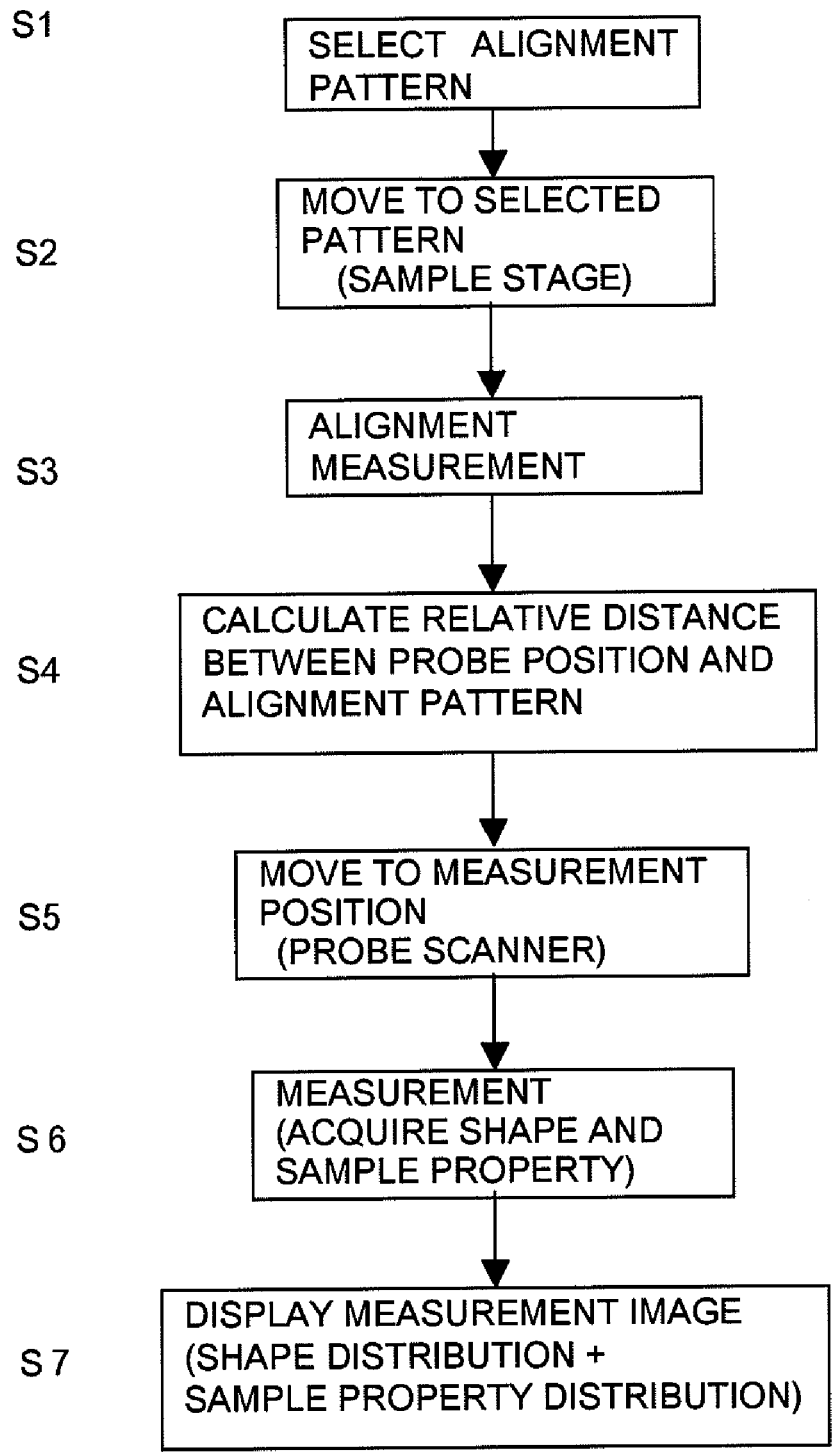
FIG. 15 is a diagram illustrating the alignment between a probe position and a measurement point as well as the flow of measurement.

Thus, the present invention enables not only the evaluation of the sample for flatness, for example, for erosion or dishing, but also inspection for the presence or absence of under-polishing. FIG. 15 shows the flow of the alignment and measurement described above.

The adhesion image used in the present embodiment is for a property that can be detected by performing scans while bringing the probe into intermittent contact with the sample. However, even with another scanning scheme, the present invention can be implemented by using a sample property that can be detected using the scanning scheme used.

Figure 16:
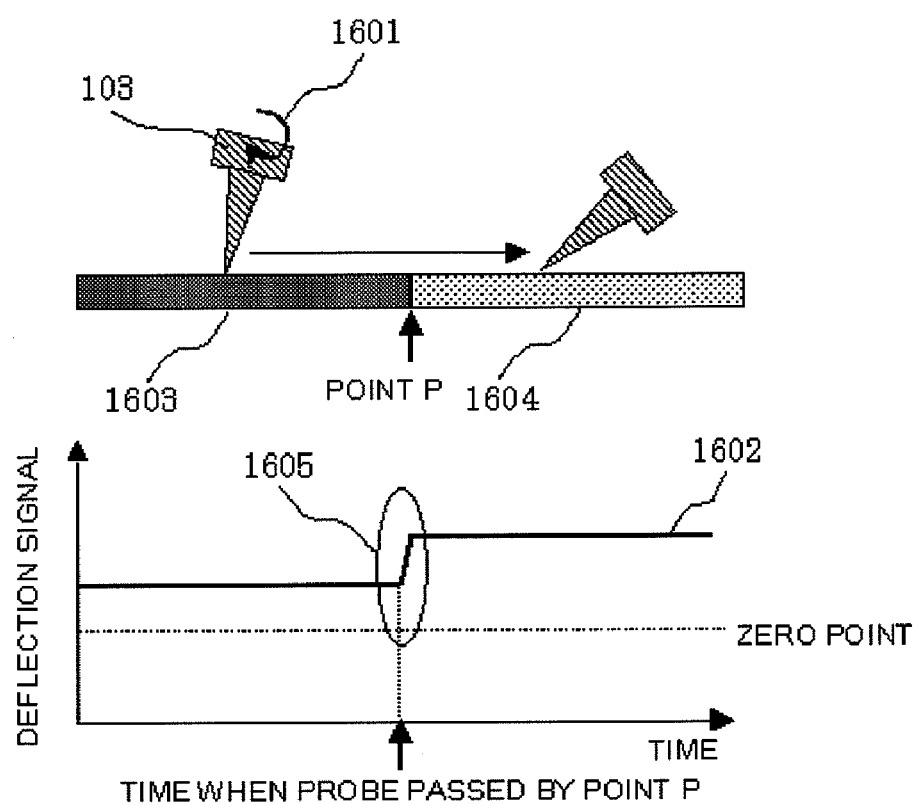
FIG. 16 is a diagram illustrating a method for detecting a friction image.

With reference to FIG. 16, description will be given of a friction image that can be acquired by, for example, a scanning scheme of bringing the probe into continuous contact with the sample (the scanning scheme generally called a contact mode).

FIG. 16 shows an example in which a sample composed of different surface materials is measured in the contact mode. In the contact mode, during probe scanning, the contact force between the probe and the sample is detected by the deflection and torsion detector 105 on the basis of deflection of the probe. The sample surface is scanned with the contact force controlled to a constant value.

In this case, the frictional force between the probe and the sample is detected as the torsion (torsion signal) 1601 of the probe. Showing an image for the detected torsion signal 1602 enables the acquisition of an image for the friction between the probe and the sample.

As shown in FIG. 16, the sample surface composed of different materials varies the frictional force (torsion signal) between the probe and the sample (1605). This enables the acquisition of an image which is similar to the image 1403 and which allows the wiring material portion to be identified.

Of course, an image which is similar to the image 1403 and which allows the wiring to be identified can also be acquired using the elastic property, which can be acquired by the present scanning scheme, or an electrical or optical property which can be acquired by irradiating the top of the probe with light or applying a voltage across the probe and the sample as disclosed in Japanese Patent Laid-Open Publication No. 2004-125540. Moreover, using a combination of a plurality of sample property images enables the material boundary to be more accurately detected.

Further, in the example of the present embodiment, the present invention is applied to the damascene wiring process in the manufacture of a semiconductor. However, the present invention is of course applicable to the evaluation of flat polishing that results in the exposure of a plurality of materials from the sample surface, such as a flat process during a plug process, a dual damascene process, or a shallow trench isolation process (STI). The present invention is also applicable to the evaluation of such flat polishing as results in the exposure of a plurality of materials from the sample surface, for a process other than the semiconductor manufacturing process, such as a magnetic head forming process.

What is claimed is:

1. A scanning probe microscope that uses a probe to scan a surface of a sample to detect interaction between the probe and the sample surface to measure a sample property, the microscope comprising:

a sample stage on which the sample is placed;

the probe;

driving means for three-dimensionally moving the probe relative to the sample placed on the sample stage;

control means for controlling the driving means;

means for detecting the deflection of the probe; and means for detecting displacement of the probe;

wherein the driving means moves the probe relative to the sample surface while allowing the probe to withdraw from or approach the sample surface with a variable amplitude;

wherein the deflection of the probe and the displacement of the probe are used to acquire at least one sample property to display a distribution of the sample property;

wherein the sample property is a shape of the sample surface, or an elastic property of the sample surface, or an adhesive force of the sample surface, or the film thickness of an adhesive layer in the sample surface, or a position of a material boundary in a pattern sidewall of the sample; and wherein the adhesive force is acquired from a maximum value of the deflection resulting from withdrawal of the probe from the sample.

2. The scanning probe microscope according to claim 1, wherein when the probe is withdrawn from the sample, the probe is elevated from the sample until the probe separates from the sample surface against adhesion of the sample surface.

3. The scanning probe microscope according to claim 1, wherein in allowing the probe to approach the sample, the driving means approaches the sample first at a predetermined speed and then under contact force servo control until a given contact force is reached.

4. The scanning probe microscope according to claim 1, wherein if the maximum value of the deflection exceeds a detection range of the means for detecting the deflection, the adhesive force is calculated from a change rate of the deflection resulting from withdrawal of the probe and a time for which the deflection exceeds the detection range.

5. The scanning probe microscope according to claim 1, wherein the adhesive force is calculated from a travel distance of the probe required to withdraw the probe from the sample.

6. The scanning probe microscope according to claim 1, wherein the position of the material boundary in the pattern sidewall is detected on the basis of a position of a Z axis of the probe observed at a moment when the change rate of the deflection changes as a result of withdrawal of the probe adhering to the pattern sidewall having the material boundary.

7. The scanning probe microscope according to claim 1, wherein if an adhesive layer is present on the sample surface, the film thickness of the adhesive layer is calculated from the position of the Z axis of the probe observed at a moment when the change rate of the deflection changes as a result of approach or withdrawal of the probe to or from the sample.

8. The scanning probe microscope according to claim 1, wherein the elastic property is calculated from the travel distance of the probe and deflection resulting from approach or withdrawal of the probe to or from the sample that is in contact with the probe.

9. The scanning probe microscope according to claim 1, wherein an artifactual effect of the type of the probe or wear of the probe is corrected on the basis of the acquired adhesive force of the sample surface to display a distribution of the adhesive force.

10. The scanning probe microscope according to claim 1, wherein to perform corrections, focus curve data on at least one point is acquired on a calibration sample in an environment in which temperature and humidity are controlled to given values, and an average value of adhesive forces measured with the force curves is used to normalize the adhesive force of the measurement sample.

11. A scanning probe microscope that uses a probe to scan a surface of a sample to detect interaction between the probe and the sample surface to measure a sample property, the microscope comprising a sample stage on which the sample is placed, the probe, driving means for three-dimensionally moving the probe relative to the sample placed on the sample stage, control means for controlling the driving means, means for detecting the deflection of the probe, and means for detecting displacement of the probe, wherein the driving means moves the probe over the sample surface while allowing the probe to withdraw from or approach the sample surface, and when the deflection of the probe and the displacement of the probe is used to acquire an adhesive force of the sample surface to display a distribution of the adhesive force, an artifactual effect of the type of the probe or wear of the probe is corrected on the basis of the acquired adhesive force of the sample surface to display the distribution of the adhesive force.

12. The scanning probe microscope according to claim 11, wherein to perform corrections, focus curve data on at least one point is acquired using a calibration sample of specified materials, in an environment in which temperature and humidity are controlled to given values, and an average value of adhesive forces measured with the force curves is used to normalize the adhesive force of the measurement sample.

13. A scanning probe microscope that uses a probe to scan a surface of a sample to detect interaction between the probe and the sample surface to measure a sample property, the microscope comprising a sample stage on which the sample is placed, the probe, driving means for three-dimensionally moving the probe relative to the sample placed on the sample stage, control means for controlling the driving means, means for detecting the deflection of the probe, and means for detecting displacement of the probe, the scanning probe microscope measuring at least one sample property, wherein the position of the probe is aligned with a measurement point by acquiring the sample property from an alignment pattern, detecting area of the alignment pattern in a distribution image of the acquired sample property, and determining a positional relationship between the probe and the measurement point on the basis of the position of the detected pattern area in the alignment measurement area.

14. The scanning probe microscope according to claim 13, wherein the sample property is a combination of at least one of a shape of the sample surface, a frictional property of the sample surface, an elastic property of the sample surface, an adhesive force of the sample surface, an electrical property of the sample surface, and an optical property of the sample surface.

15. A scanning probe microscope that uses a probe to scan a surface of a sample to detect interaction between the probe and the sample surface to measure a sample property, the microscope comprising a sample stage on which the sample is placed, the probe, driving means for three-dimensionally moving the probe relative to the sample placed on the sample stage, control means for controlling the driving means, means for detecting the deflection of the probe, and means for detecting displacement of the probe, the scanning probe microscope measuring a surface shape or sample property of the sample, wherein a surface shape distribution and a sample property distribution of the sample in the same measurement area are acquired to superimposed display the surface shape distribution and the sample property distribution at the same measurement position in an XY plane.

16. The scanning probe microscope according to claim 15, wherein the sample property is a combination of at least one of a shape of the sample surface, a frictional property of the sample surface, an elastic property of the sample surface, an adhesive force of the sample surface, an electrical property of the sample surface, and an optical property of the sample surface.

17. A method for evaluating a flat polishing characterization in manufacture of a thin film device using a scanning probe microscope, wherein a flat polishing process with resultant exposure of a plurality of materials from a polished surface of a sample comprises using the scanning probe microscope to acquire a surface shape and another sample property of the flat polished sample in the measurement area, using a distribution image of the sample property acquired to determine each material area in the measurement area, and evaluating a polishing property on the basis of the surface shape in each material area.

18. The method for evaluating a flat polishing characterization according to claim 17, wherein the sample property is a combination of at least one of a frictional property of the sample surface, an elastic property of the sample surface, an adhesive force of the sample surface, an electrical property of the sample surface, and an optical property of the sample surface.

19. The method for evaluating a flat polishing characterization according to claim 17, wherein the flat polishing process with resultant exposure of the plurality of materials is a flat process used in manufacture of a semiconductor device or in formation of a magnetic head.

20. The method for evaluating a flat polishing characterization according to claim 17, wherein the polishing characterization is at least one of erosion, dishing, and polishing residue in the flat process.

* * * * *